US009286346B2

(12) United States Patent
Pruet, III

(10) Patent No.: US 9,286,346 B2
(45) Date of Patent: Mar. 15, 2016

(54) REPLICATION-ONLY TRIGGERS

(75) Inventor: Clarence Madison Pruet, III, Flower Mound, TX (US)

(73) Assignee: International Business Machines Corporation, Armonk, NY (US)

(*) Notice: Subject to any disclaimer, the term of this patent is extended or adjusted under 35 U.S.C. 154(b) by 742 days.

(21) Appl. No.: 11/061,072

(22) Filed: Feb. 18, 2005

(65) Prior Publication Data

US 2006/0190498 A1  Aug. 24, 2006

(51) Int. Cl.
G06F 17/00 (2006.01)
G06F 7/00 (2006.01)
G06F 17/30 (2006.01)

(52) U.S. Cl.
CPC ...... *G06F 17/30415* (2013.01); *G06F 17/3051* (2013.01)

(58) Field of Classification Search
CPC .................. G06F 17/30575; G06F 17/3051
USPC .......................... 707/100–204, 615
See application file for complete search history.

(56) References Cited

U.S. PATENT DOCUMENTS

| 5,170,480 A | 12/1992 | Mohan et al. |
| 5,381,545 A | 1/1995 | Baker et al. |
| 5,423,037 A | 6/1995 | Hvasshovd |
| 5,675,727 A | 10/1997 | Watanabe |
| 5,684,984 A | 11/1997 | Jones et al. |
| 5,737,601 A | 4/1998 | Jain et al. |
| 5,745,753 A | 4/1998 | Mosher, Jr. |
| 5,781,912 A | 7/1998 | Demers et al. |
| 5,799,306 A | 8/1998 | Sun et al. |
| 5,806,075 A | 9/1998 | Jain et al. |
| 5,884,327 A * | 3/1999 | Cotner et al. .............. 239/553.3 |
| 5,884,328 A | 3/1999 | Mosher, Jr. |
| 5,926,819 A | 7/1999 | Doo et al. |
| 5,937,415 A | 8/1999 | Sheffield et al. |
| 6,058,401 A | 5/2000 | Stamos et al. |
| 6,061,769 A | 5/2000 | Kapulka et al. |
| 6,119,130 A | 9/2000 | Nguyen et al. |
| 6,122,630 A | 9/2000 | Strickler et al. |
| 6,216,137 B1 | 4/2001 | Nguyen et al. |
| 6,298,338 B1 * | 10/2001 | Melton et al. ................. 707/765 |
| 6,351,795 B1 | 2/2002 | Hagersten |
| 6,363,387 B1 | 3/2002 | Ponnekanti et al. |
| 6,377,959 B1 | 4/2002 | Carlson |
| 6,408,163 B1 | 6/2002 | Fik |

(Continued)

FOREIGN PATENT DOCUMENTS

| JP | 07210435 | 8/1995 |
| WO | 03044697 A1 | 5/2003 |

OTHER PUBLICATIONS

"Strategies and Technques for Using Oracle7 Replication," Dominic, Oracle Consulting, 1995.*

(Continued)

*Primary Examiner* — Pavan Mamillapalli
(74) *Attorney, Agent, or Firm* — Patterson & Sheridan, LLP

(57) ABSTRACT

A method provides a replication-only trigger in a database management system. The database management system has a source server and a target server. At least one replication-only trigger which is associated with a replication operation is registered. The replication-only trigger is associated with a stored procedure. The stored procedure is invoked in response to an occurrence of the replication operation in replicating data from the source server to the target server.

28 Claims, 7 Drawing Sheets

(56) References Cited

U.S. PATENT DOCUMENTS

| | | |
|---|---|---|
| 6,421,686 B1 | 7/2002 | Martin, Jr. |
| 6,460,052 B1 | 10/2002 | Thomas et al. |
| 6,507,880 B1 | 1/2003 | Arimilli et al. |
| 6,510,421 B1 | 1/2003 | Ganesh et al. |
| 6,529,917 B1 | 3/2003 | Zoltan |
| 6,529,932 B1 | 3/2003 | Dadiomov et al. |
| 6,532,479 B2 | 3/2003 | Souder et al. |
| 6,553,442 B1 | 4/2003 | Arimilli et al. |
| 6,584,477 B1 * | 6/2003 | Mosher, Jr. .................. 707/204 |
| 6,587,856 B1 | 7/2003 | Srinivasan et al. |
| 6,615,223 B1 | 9/2003 | Shih et al. |
| 6,668,260 B2 | 12/2003 | Zoltan |
| 6,681,226 B2 | 1/2004 | Bretl et al. |
| 6,721,765 B2 | 4/2004 | Ghosh et al. |
| 6,732,122 B2 | 5/2004 | Zoltan |
| 6,738,971 B2 | 5/2004 | Chandrasekaran et al. |
| 6,748,374 B1 | 6/2004 | Madan et al. |
| 6,877,016 B1 * | 4/2005 | Hart et al. .................... 707/201 |
| 6,915,287 B1 | 7/2005 | Felsted et al. |
| 6,983,277 B2 * | 1/2006 | Yamaguchi et al. .............. 707/8 |
| 7,003,531 B2 * | 2/2006 | Holenstein et al. |
| 7,162,689 B2 | 1/2007 | Demers et al. |
| 7,200,620 B2 * | 4/2007 | Gupta ........................ 707/201 |
| 7,200,624 B2 * | 4/2007 | He et al. ...................... 707/203 |
| 7,376,675 B2 | 5/2008 | Pruet, III |
| 7,844,615 B2 * | 11/2010 | Brunswig ......... G06F 17/30557<br>707/758 |
| 8,037,056 B2 | 10/2011 | Naicken et al. |
| 8,214,353 B2 | 7/2012 | Inturi et al. |
| 8,639,677 B2 | 1/2014 | Pruet, III |
| 2001/0007103 A1 | 7/2001 | Breiter et al. |
| 2002/0007363 A1 | 1/2002 | Vaitzblit |
| 2002/0016793 A1 * | 2/2002 | Keith, Jr. ..................... 707/201 |
| 2002/0065999 A1 | 5/2002 | Kikuchi et al. |
| 2002/0078231 A1 | 6/2002 | Chang et al. |
| 2002/0087586 A1 | 7/2002 | Yamagishi |
| 2002/0091716 A1 | 7/2002 | Yokouchi |
| 2002/0099726 A1 | 7/2002 | Crudele et al. |
| 2002/0099728 A1 | 7/2002 | Lees et al. |
| 2002/0169788 A1 | 11/2002 | Lee et al. |
| 2002/0174142 A1 | 11/2002 | Demers et al. |
| 2002/0198899 A1 * | 12/2002 | Yamaguchi et al. .......... 707/200 |
| 2003/0046342 A1 | 3/2003 | Felt et al. |
| 2003/0070000 A1 * | 4/2003 | Coker et al. ................. 709/318 |
| 2003/0145021 A1 * | 7/2003 | Parkkinen .................... 707/204 |
| 2003/0149709 A1 | 8/2003 | Banks |
| 2003/0154238 A1 | 8/2003 | Murphy et al. |
| 2003/0158868 A1 | 8/2003 | Zoltan |
| 2003/0182308 A1 | 9/2003 | Ernst et al. |
| 2003/0200212 A1 * | 10/2003 | Benson et al. .................... 707/7 |
| 2003/0208511 A1 | 11/2003 | Earl et al. |
| 2003/0212789 A1 | 11/2003 | Hamel et al. |
| 2003/0225760 A1 | 12/2003 | Ruuth et al. |
| 2003/0236786 A1 | 12/2003 | Shi et al. |
| 2004/0006563 A1 | 1/2004 | Zwiegincew et al. |
| 2004/0025079 A1 | 2/2004 | Srinivasan et al. |
| 2004/0030703 A1 | 2/2004 | Bourbonnais et al. |
| 2004/0030739 A1 | 2/2004 | Yousefi'zadeh |
| 2004/0078379 A1 | 4/2004 | Hinshaw et al. |
| 2004/0103342 A1 | 5/2004 | Moser et al. |
| 2004/0133591 A1 | 7/2004 | Holenstein et al. |
| 2004/0158588 A1 | 8/2004 | Pruet, III |
| 2004/0205066 A1 | 10/2004 | Bhattacharjee et al. |
| 2005/0021567 A1 * | 1/2005 | Holenstein et al. ........... 707/200 |
| 2005/0125423 A1 | 6/2005 | Chou et al. |
| 2005/0165818 A1 | 7/2005 | Cole et al. |
| 2005/0193024 A1 | 9/2005 | Beyer et al. |
| 2005/0193035 A1 | 9/2005 | Byrne |
| 2005/0193040 A1 | 9/2005 | Adiba et al. |
| 2005/0193041 A1 | 9/2005 | Bourbonnais et al. |
| 2005/0278394 A1 | 12/2005 | Oks et al. |
| 2006/0031811 A1 | 2/2006 | Ernst et al. |
| 2006/0047713 A1 | 3/2006 | Gornshtein et al. |
| 2006/0136471 A1 | 6/2006 | Ge et al. |
| 2006/0190497 A1 | 8/2006 | Inturi et al. |
| 2006/0190503 A1 | 8/2006 | Naicken et al. |
| 2006/0190504 A1 | 8/2006 | Pruet |
| 2007/0143247 A1 * | 6/2007 | Brunswig ......... G06F 17/30557<br>707/999.002 |
| 2007/0226218 A1 * | 9/2007 | Chatterjee et al. ................. 707/8 |
| 2008/0059469 A1 | 3/2008 | Pruet |
| 2008/0215586 A1 | 9/2008 | Pruet |
| 2008/0270490 A1 * | 10/2008 | Watterott et al. ............. 707/204 |
| 2009/0219835 A1 * | 9/2009 | Bandholz et al. ............. 370/255 |
| 2012/0005160 A1 | 1/2012 | Naicken et al. |

OTHER PUBLICATIONS

Cuenca-Acuna et al., "Autonomous Replication for High Availability in Unstructured P2P Systems", Proceedings of the 22nd International Symposium on Reliable Distributed Systems (SRDS'03), 2003, 10 pages.

Ghandeharizadeh et al., "Placement of Continuous Media in Wireless Peer-to-Peer Networks," IEEE Transactions on Multimedia, vol. 6, No. 2, Apr. 2004, pp. 335-342.

Joshi et al., "ShadowObjects: A Programming Model for Service Replication in Distributed Object Systems," Journal of Parallel and Distributed Computing, vol. 59, No. 1, Oct. 1999. 16 pages.

"Technique for Replicating Distributed Directory Information", May 1991, IBM Technical Disclosure Bulletin, pp. 113-120, [online] [retrieved on Jun. 4, 2004] Retrieved from the Internet:<URL: https://www.delphion.com/tdbs/tdb?o=91A%2061241>. 6 pages.

"Informix Guide to SQL Syntax, Chapter 1: SQL Statements, Alter Table," [online] copyright 1998, Informix Software, Inc., [Retrieved on Jan. 17, 2005]. Retrieved from the Internet: <URL: http://www-306.ibm.com/software/data/informix/pubs/library/datablade/dbdk/sqls/01alter.fm1.html>. 22 pages.

Al-Karmi et al., IBM Technical Disclosure Bulletin, "Type Modification in Object Oriented database Using Exception Handling," IBMTDBS#AAA93A063495, v36n12 12-93, pp. 579-580. [online] Dec. 1993 [Retrieved on Aug. 30, 2004] Retrieved from the Internet: <URL: https://www.delphion.com/tdbs/tdb?order=93A+63495>. 2 pages.

Teresa K. Ge, Wayne W. Lee, Brenda M. Lam, United States Patent Application titled "Differential Management of Database Schema Changes," Filed Dec. 17, 2004, Assigned to International Business Machines Corporation, IBM. 23 pages.

Dominic J. Delmolino, "Strategies and Techniques for Using Oracle7 Replication: Part 1", Archives, Oracle Magazine Interactive, Methodology [online], May/Jun. 1995, [retrieved on: Jul. 16, 2004] Retrieved from the Internet: <URL: http://arthemis.na.astro.it/oracle/oramag/archives/55METH.html>. 11 pages.

Fabio A.M. Porto et al. "Persistent Object Synchronization with Active Relational Databases", IEEE/ACM AN-6364906, pp. 53-62; Technology of Object-Oriented Languages and Systems, Aug. 1-5, 1999, Santa Barbara, California, IEEE Computer Society.

T.N. Vijaykumar et al, "Transient-Fault Recovery Using Simultaneous Multithreading," Proceedings of the 29th Annual International Symposium on Computer Architecture (ISCA '02), 1063-6897/02, copyright 2002 IEEE, IEEE Computer Society, 12 pages.

IBM Technical Disclosure Bulletin, "Referential Integrity Implementation Details and Advantages," Mar. 1995, pp. 477-488, [online] [retrieved on: Jun. 4, 2004] Retrieved from the Internet: <URL: https//www.delphion.com/tdbs/tdb?o=95A%2060598>. 6 pages.

IBM Informix Dynamic Server Enterprise Replication Guide, Version 9.4, Mar. 2003, Part No. CT1T2NA, pp. i-ix, pp. 1 to 9-22.

IBM Informix Dynamic Server Enterprise Replication Guide, Version 9.4, Mar. 2003, Part No. CT1T2NA, pp. i-ii, pp. Appendix A-1 to G-4, Index pp. 1-18.

Non-Final Office Action of Jun. 22, 2007 for U.S. Appl. No. 11/061,071 <10 pages>.

Notice of Allowance of Jan. 14, 2008 for U.S. Appl. No. 11/061,071 <9 pages.>.

Non-Final Office Action of Jun. 21, 2007 for U.S. Appl. No. 11/060,986 <15 pages>.

Final Office Action of Dec. 28, 2007 for U.S. Appl. No. 11/060,986 <16 pages>.

(56) References Cited

OTHER PUBLICATIONS

Advisory Action of Mar. 25, 2008 for U.S. Appl. No. 11/060,986 <3 pages>.
Non-Final Office Action of May 30, 2008 for U.S. Appl. No. 11/060,986 <14 pages>.
Final Office Action of Nov. 20, 2008 for U.S. Appl. No. 11/060,986 <21 pages>.
Non-Final Office Action of May 30, 2007 for U.S. Appl. No. 11/060,924 <13 pages>.
Final Office Action of Jan. 10, 2008 for U.S. Appl. No. 11/060,924 <21 page>.
Advisory Action of Apr. 2, 2008 for U.S. Appl. No. 11/060,924 <3 pages>.
Non-Final Office Action of Jun. 20, 2008 for U.S. Appl. No. 11/060,924 <21 pages>.
Final Office Action of Jan. 5, 2009 for U.S. Appl. No. 11/060,924 <22 pages>.
Non-Final Office Action of Feb. 12, 2009 for U.S. Appl. No. 11/469,257 <17 pages>.
Non-Final Office Action for U.S. Appl. No. 11/060,986 having a notification date of May 28, 2009 <20 pages>.
Non-Final Office Action for U.S. Appl. No. 11/060,924 having a notification date of Aug. 17, 2009 <26 pages>.
Notice of Abandonment for U.S. Appl. No. 11/469,257 having a notification date of Sep. 25, 2009 <2 pages>.
Final Office Action of Feb. 19, 2010 for U.S. Appl. No. 11/060,986 <33 pages>.
Final Office Action of Apr. 14, 2010 for U.S. Appl. No. 11/060,924 <25 pages>.
Joseph Silva et al., "An Algorithm to Compare OO-Conceptual Schemas," 18th IEEE International Conference on Software Maintenance (ICSM'02), Oct. 2002: pp. 351-358.
Rocco De Nicola et al., "A modal logic for mobile agents," Journal of ACM Transactions on Computational Logic (TOCL), Jan. 2004, vol. 5(1): pp. 1-53.
Barbara Staudt Lerner, "A model for compound type changes encountered in schema evolution," Journal of ACM Transactions on Database Systems (TODS), Mar. 2000, vol. 25(1): pp. 83-127.
Baowen Xu et al., "Parallel Genetic Algorithms with Schema Migration," 26th Annual International Computer Software and Applications Conference, Aug. 2002: pp. 879-886.
T. M. Wittenburg et al., "An Adaptive Document Management System for Shared Multimedia Data," IEEE International Conference on Multimedia Computing and Systems, 1994: pp. 245-254.
Office Action History of U.S. Appl. No. 11/061,071 from Jun. 22, 2007 to Apr. 30, 2008.
Office Action History of U.S. Appl. No. 12/102,702 from Nov. 20, 2008 to Mar. 30, 2011.
Office Action History of U.S. Appl. No. 11/060,986 from Jun. 21, 2007 to Apr. 6, 2011.
Office Action History of U.S. Appl. No. 11/060,924 from May 30, 2007 to Jun. 10, 2011.
Office Action History of U.S. Appl. No. 11/469,257 from Feb. 12, 2009 to Sep. 25, 2009.
Office Action History of U.S. Appl. No. 11/016,228 from Mar. 7, 2007 to Oct. 19, 2009.
Office Action history of U.S. Appl. No. 11/060,986, from Jun. 20, 2011 to Jun. 13, 2012.
Office Action history of U.S. Appl. No. 12/102,702, from Aug. 3, 2012 to Jan. 4, 2013.

\* cited by examiner

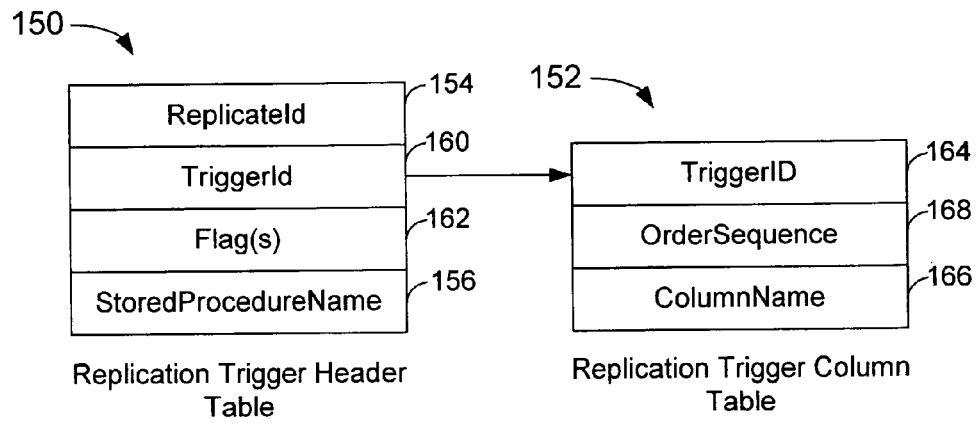
FIG. 4
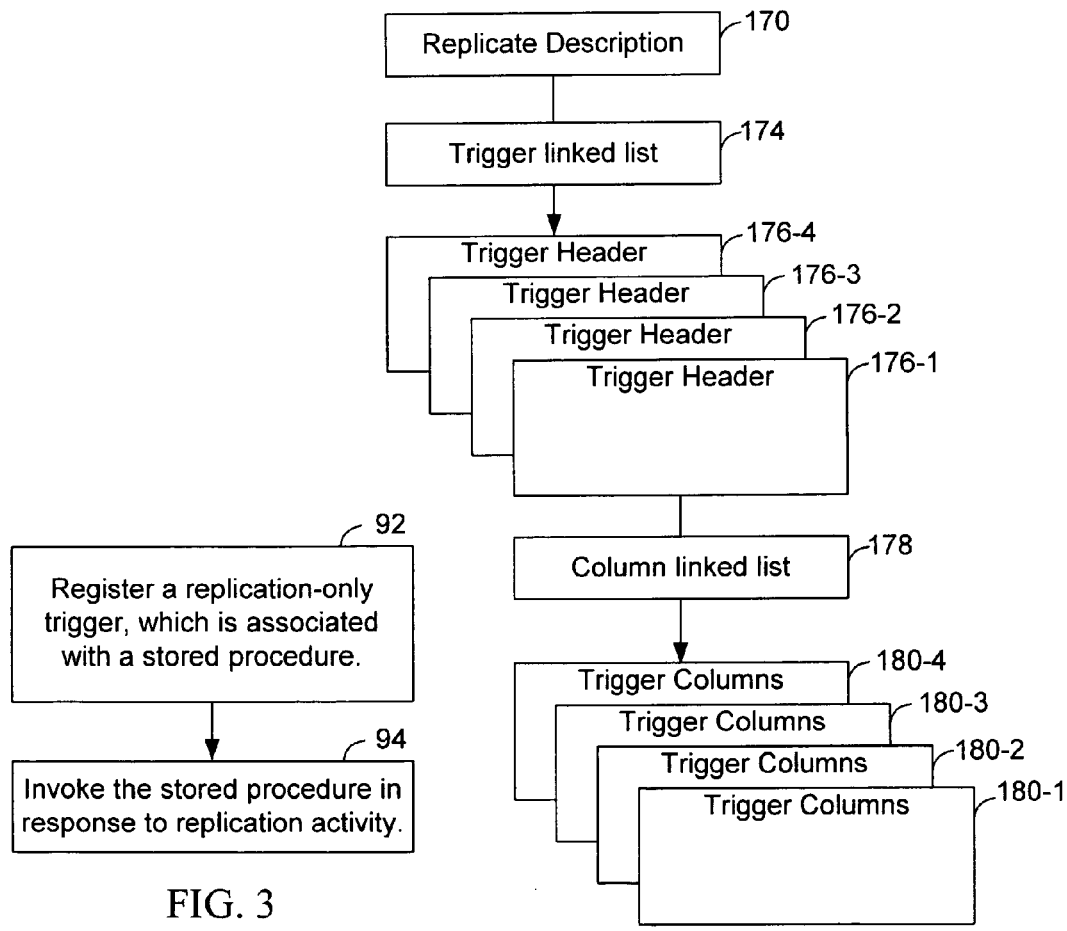
FIG. 3
FIG. 5

REPLICATION-ONLY TRIGGERS

CROSS REFERENCE TO RELATED APPLICATIONS

Co-pending U.S. application Ser. No. 11/061,071 entitled "Simulating Multi-User Activity While Maintaining Original Linear Request Order for Asynchronous Transactional Events," filed concurrently herewith, by Clarence Madison Pruet III, International Business Machines Corporation (IBM), assigned to the assignee of the present invention, is incorporated herein by reference in its entirety.

Co-pending U.S. application Ser. No. 11/060,986 entitled "Support for Schema Evolution in a Multi-Node Peer-to-Peer Replication Environment," filed concurrently herewith, by Nagaraju Inturi and Clarence Madison Pruet III, International Business Machines Corporation (IBM), assigned to the assignee of the present invention, is incorporated herein by reference in its entirety.

Co-pending U.S. application Ser. No. 11/060,924 entitled "Online Repair of a Replicated Table," filed concurrently herewith, by Rajesh Govind Naicken, Clarence Madison Pruet III, and Konduru Israel Rajakumar, International Business Machines Corporation (IBM), assigned to the assignee of the present invention, is incorporated herein by reference in its entirety.

BACKGROUND OF THE INVENTION 1.0 Field of the Invention

This invention relates to a database management system; and in particular, this invention relates to replicating data in a database management system.

2.0 Description of the Related Art

Database management systems allow large volumes of data to be stored and accessed efficiently and conveniently in a computer system. In a database management system, data is stored in database tables which organize the data into rows and columns. FIG. 1 depicts an exemplary database table 20 which has rows 22 and columns 24. To more quickly access the data in a database table, an index may be generated based on one or more specified columns of the database table. In a relational database management system, specified columns are used to associate tables with each other.

A database management system responds to user commands to store and access the data. The user commands are typically Structured Query Language statements such as SELECT, INSERT, UPDATE and DELETE, to select, insert, update and delete, respectively, the data in the rows and columns. The SQL statements typically conform to a SQL standard as published by the American National Standards Institute (ANSI) or the International Standards Organization (ISO).

Departments within an enterprise may have their own database management systems, typically at different sites. An enterprise typically wants to share data throughout the enterprise. A technique called replication is used to share data among multiple database management systems.

A replication system manages multiple copies of data at one or more sites, which allows the data to be shared among multiple database management systems. Data may be replicated synchronously or asynchronously. In synchronous data replication, a two-phase commit technique is used. In a two-phase commit, a transaction is applied only if all interconnected distributed sites agree to accept the transaction. Typically all hardware components and networks in the replication system must be available at all times in for synchronous replication.

Asynchronous data replication allows data to be replicated, at least on a limited basis, and thus allows for system and network failures. In one type of asynchronous replication system, referred to as primary-target, all database changes originate at the primary database and are replicated to the target databases. In another type of replication system, referred to as update-anywhere, updates to each database are applied at all other databases of the replication system.

An insert, update or delete to the tables of a database is a transactional event. A transaction comprises one or more transactional events that are treated as a unit. A commit is another type of transactional event which indicates the end of a transaction and causes the database to be changed in accordance with any inserts, updates or deletes associated with the transaction.

In some database management systems, a log writer updates a log as transactional events occur. Each transactional event is associated with an entry in the log, and each entry in the log is associated with a value representing a log position.

When a replication system is used, a user typically specifies the types of transactional events which cause data to be replicated. In addition, the user typically specifies the data which will be replicated, such as certain columns or an entire row of a table. In some embodiments, the log writer of the database management system marks certain transactional events for replication in accordance with the specified types of transactional events. The replication system reads the log, retrieves the marked transactional events, and transmits those transactional events to one or more specified target servers. The target server applies the transactional events to the replicated table(s) on the target server.

Various database management systems generally support what are known as triggers. In some embodiments, a trigger consists of special logic that is executed when rows are inserted, updated or deleted from a table within the database. In many systems, the trigger logic is extended by invoking a stored procedure, typically written by a user, within the body of the trigger. The trigger is typically invoked by the activity of a user with the database.

Some replication techniques use triggers to capture data. For example, in trigger-based data capture, when the data in a table changes, the trigger activates the replication process. Data changes are grouped into transactions and a single transaction may trigger several replications if that transaction modifies several tables.

In some applications, it would be desirable to update a control panel and send alerts to specified persons when certain kinds of data are replicated to a table. A conventional trigger may be used. However, in some replication systems, the conventional trigger would be activated in response to data changes from users in addition to data changes from replication. In other applications such as a banking system, it is desirable to send an acknowledgment when data from a server at a remote branch is replicated to other servers. The conventional trigger described above is activated in response to data changing in a table, and therefore cannot be used to notify a source of replicated data that the data has been applied at a target server or to notify the source of replicated data that the data was not applied at the target server. Therefore, there is a need for a technique to provide an improved trigger.

SUMMARY OF THE INVENTION

To overcome the limitations in the prior art described above, and to overcome other limitations that will become apparent upon reading and understanding the present specification, various embodiments of a method, system and article of manufacture provide a trigger in a database management system. The database management system has a source server and a target server. At least one replication-only trigger which is associated with a replication operation is registered. The replication-only trigger is associated with a stored procedure. The stored procedure is invoked in response to an occurrence of the replication operation in replicating data from the source server to the target server.

In some embodiments, the replication-only trigger is invoked prior to a commit of a replicated transaction. In other embodiments, the replication-only trigger is invoked after a replicated transaction has committed. The replication-only trigger can be used to notify a source of replicated data that the data was successfully applied on a target server. Alternately, the replication-only trigger can be used to notify the source of replicated data that the data failed to be applied on the target server.

BRIEF DESCRIPTION OF THE DRAWINGS

The teachings of the present invention can be readily understood by considering the following description in conjunction with the accompanying drawings, in which:

FIG. 3 depicts a high-level flowchart of an embodiment of registering and invoking a replication-only trigger;

FIG. 4 depicts a block diagram of an embodiment of a replication trigger header table and a replication trigger column table of the global catalog;

FIG. 5 depicts a diagram of an embodiment of a replicate description structure which is associated with a trigger linked list having multiple triggers of which one trigger is associated with a column linked list having multiple columns;

To facilitate understanding, identical reference numerals have been used, where possible, to designate identical elements that are common to some of the figures.

DETAILED DESCRIPTION

Figure 1:
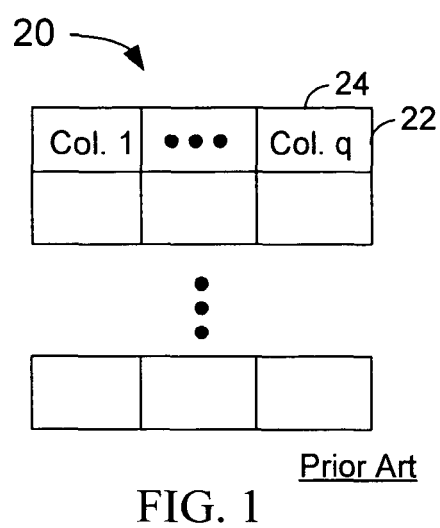
FIG. 1 depicts a block diagram of an illustrative table of a database management system.

After considering the following description, those skilled in the art will clearly realize that the teachings of the various embodiments of the present invention can be utilized to replicate data in a database management system. A method, system and article of manufacture provide a replication-only trigger in a database management system. The database management system has a source server and a target server. At least one replication-only trigger which is associated with a replication operation is configured. The replication-only trigger is associated with a stored procedure. The stored procedure is invoked in response to an occurrence of the replication operation in replicating data from the source server to the target server.

In various embodiments, a replication-only trigger is associated with a stored procedure which is executed in response to activity within the replication of data from a source to a target. In some embodiments, the data of the replicated row is passed to the stored procedure. A replication-only trigger is not executed by the database server as a conventional trigger which would be invoked by the activity of a client to the database. The replication-only trigger is invoked in response to replication activity.

In various embodiments, the replication-only trigger is registered as part of the replication configuration, rather than being defined as part of conventional SQL trigger definition.

A database server is a software application which implements a database management system. A replication server is a database server that participates in data replication. Multiple database servers can execute on the same physical server computer, and each database server can participate in replication.

In replication, changes to one or more tables of a database on a source replication server are collected, transported and applied to one or more corresponding tables on the replication target servers. A replication application implements the replication server functionality.

To replicate data, a user defines a replicate, that is, the user provides replicate information. A replicate is associated with one or more replication servers, also referred to as participants, a table to replicate among the participants, and the columns of the table that will be replicated. The replicate is also associated with various attributes which describe how to replicate the data among the participants, such as conflict resolution rules.

The replication server maintains replication information in a global catalog. A replicate definition comprises one or more tables in the global catalog and contains the replication information. The replicate definition comprises information specifying the replicate configuration and environment, information specifying what data is to be replicated, for example, whether to replicate particular columns or an entire row, and information specifying the conditions under which the data should be replicated. The replicate definition also contains various specified attributes of the replicate such as how to handle any conflicts during replication.

The replication application creates the global catalog when the replication application is initialized. In embodiments which use the IBM Informix Dynamic Server, the global catalog is called the syscdr database.

Each replication server typically has its own local copy of the global catalog and maintains one or more tables in the global catalog to keep track of the replicate definition and state. The global catalog is created when a database server is defined as a replication server. The tables in a global catalog on one replication server are typically automatically replicated to the global catalogs of the other replication servers.

Figure 2:
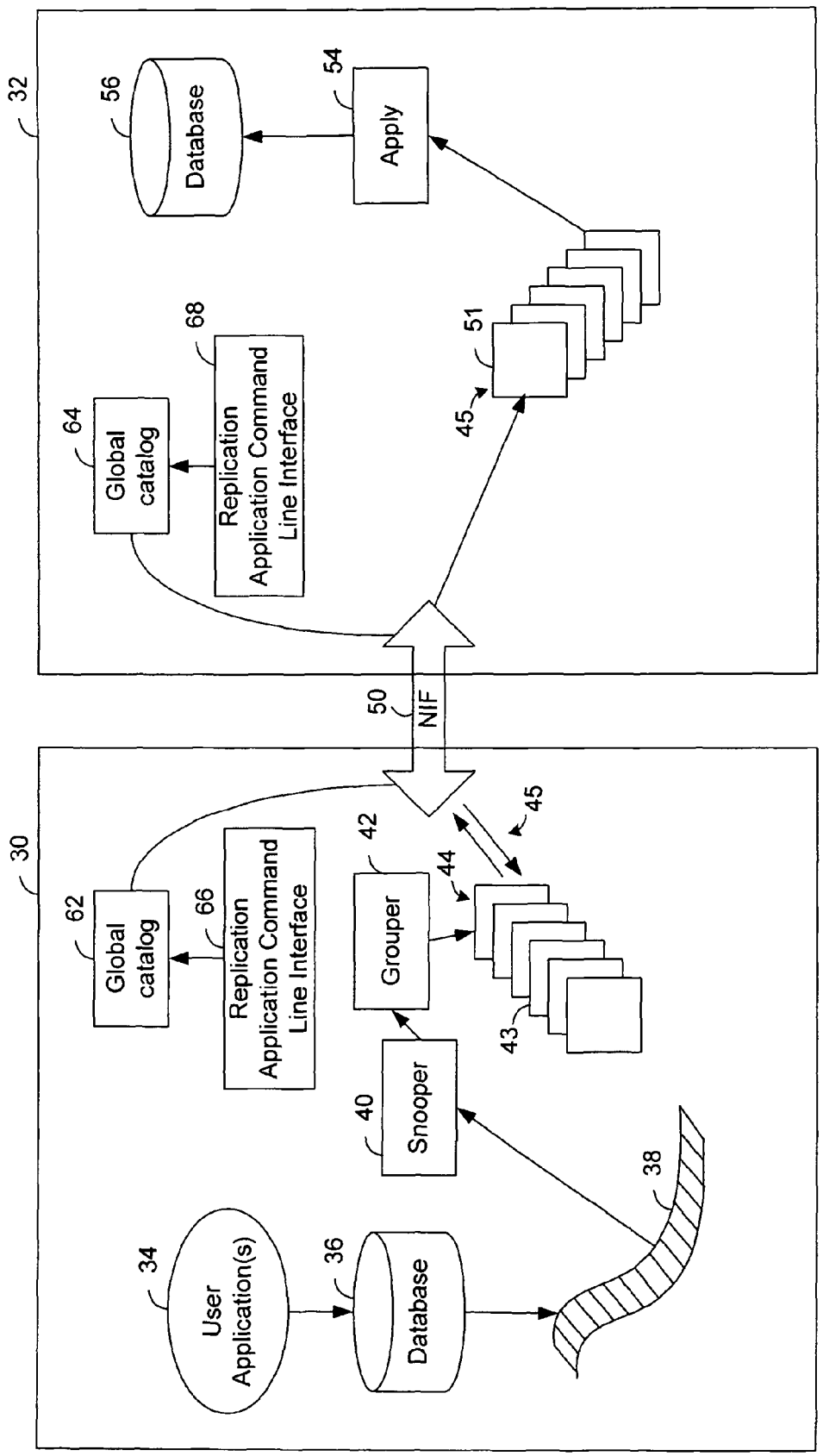
FIG. 2 depicts a diagram of an embodiment of a replication environment suitable for use with the present invention.

FIG. 2 depicts a diagram of an embodiment of a replication environment suitable for use with the present invention. A source replication server 30 and a target replication server 32 are participants, or nodes, in a replicate. The source replication server 30 and the target replication server 32 will be referred to as a source server and a target server. The source server 30 and the target server typically execute on different computer systems. In the source server 30, one or more user applications 34 are accessing and changing the tables of a database 36. The changes to the database 36 are stored in a log 38. The changes to the database are transactional events. The replication application comprises a snooper 40 and a grouper 42. The snooper 40 reads the log 38 and captures various changes to the database in accordance with the replicate definition. The grouper 42 assembles the captured changes in accordance with their associated transactions to provide transaction replication data 43 and places the transaction replication data 43 in a queue 44 to send to the target server 32 via the network interface (NIF) 50. Transaction replication data is also referred to as replication data or replicated data. As indicated by arrows 45, the queue 44 can be used to send and receive data. The queue 44 comprises a send queue to send data to the target server 32, and a receive queue to receive data from the target server 32.

In the target server 32, the transaction replication data 51 is received in a queue 52. An apply component 54 retrieves the transaction replication data 51 from the queue 52 and applies the replication data 51 to the appropriate table and column(s) in the database 56. For example, if the replicated data comprises an insert operation, the apply component 54 performs the insert operation on the table at the target server.

The source and target servers, 30 and 32, have global catalogs, 62 and 64, and a replication application command line interface, 66 and 68, respectively. The replication application command line interface 66 and 68 receives commands for the replication application. The replication application command line interface 66 and 68 is also used to update the global catalogs 62 and 64, respectively.

In various embodiments, a replication application on a replication server typically comprises a snooper, grouper and apply component. In this way, data can be replicated both to and from the replication server.

In some embodiments, the replication server computer comprises multiple central processing units or processors, and various portions of the replication operation are executed concurrently. For example, the apply component may execute on one or more processors and each portion of the apply component that executes on one processor is referred to as an apply thread.

FIG. 3 depicts a high-level flowchart of an embodiment of registering and invoking a replication-only trigger. In step 92, the replication-only trigger is registered. Typically the replication-only trigger is registered in the global catalog. The replication-only trigger is associated with a stored procedure. In step 94, the stored procedure is invoked in response to activity within the replication application.

Various embodiments of the invention will be described with respect to the IBM® (Registered Trademark of International Business Machines Corporation) Informix® (Registered Trademark of International Business Machines Corporation) Dynamic Server and the IBM Informix Enterprise Replication server. However, the invention is not meant to be limited to IBM Informix Dynamic Server or IBM Informix Enterprise Replication server and may be used with other database management systems and other replication servers.

In various embodiments, the replication-only trigger functionality is implemented in the replication application. The replication-only trigger provides the ability to extend the logic of replication by the invocation of an associated stored procedure. For example, a user at a source server may want to receive some form of an acknowledgment from an apply thread when a row has been successfully applied on a target server. In another example, an application may invoke special logic in the event that a row could not be applied on a target server.

There are two broad categories of replication-only triggers—pre-commit triggers and post-commit triggers. Pre-commit triggers are those replication-only triggers which are executed within the transaction that applies the data on a target server. The pre-commit triggers are executed within the application of a transaction by the apply component and comprise pre-commit insert triggers, pre-commit update triggers, and pre-commit delete triggers.

The apply component attempts to commit the replicated transaction data in response to a commit in the replicated transaction data. Post-commit triggers are those replication triggers which are executed after the apply component has applied the commit in the replicated transaction data, or after the apply component failed to apply the commit in the replicated transaction data. Post-commit triggers comprise post-commit-success triggers and post-commit-failure triggers. Post-commit-success triggers are those post-commit replication-only triggers which are used to indicate that the replicated transaction data was successfully applied on the target server. Post-commit-failure triggers are those post-commit replication-only triggers which are used to indicate that the replicated transaction data was not successfully applied on the target server.

In various embodiments, a post-commit trigger is executed only once for a transactional event of a transaction. In some embodiments, the post-commit triggers are executed in the same order as the commit of their associated transactions. In various embodiments, a post-commit trigger is not executed until the apply component has applied the commit associated with the replicated transaction data associated with the trigger, or until after the apply component attempted to apply the commit associated with the replicated transaction data and failed to commit the replicated transaction data associated with the trigger.

In some embodiments, a single post-commit trigger defined on a replicate may result in multiple executions of the post-commit trigger. For example, a post-commit failure trigger is defined for a replicate, and the replicated data of a transaction comprises insert and update operations. After the apply component has received and applied the commit for the transaction, the post-commit failure trigger will be executed for the insert operation and the post-commit failure trigger will be executed for the update operation.

An embodiment of registering a replication-only trigger will now be described. A replication-only trigger is registered by using a replication application utility, for example, in the IBM Informix dynamic server, a cdr utility, rather than by using a data definition language (DDL) statement. The cdr utility is a tool which is used to administer replication on the IBM Informix Dynamic Server. An exemplary command syntax to create a pre-commit trigger is as follows:

cdr define trigger -connect=serv1 -replicate=replname -name=sp -insert col1 col2 col3

The "-connect" option specifies the server which will execute the define trigger command and which will be accessed to retrieve information from and write information to the global catalog. The "-replicate" option specifies the replicate name, "replname." The "-name" option specifies the name of the replication-only trigger stored procedure, "sp." The "-insert" option specifies that the replication-only trigger is a pre-commit insert trigger. The names of the columns which are passed to the stored procedure follow the "-insert" option.

The pre-commit trigger defined above results in an "execute procedure sp(source_server, source_commit_time, col1, col2, col3)" to be performed with any insert of a row into the tables represented by the replicate named replname. The name of the replication-only trigger, "sp", the name of the source server, the source commit time, and columns col1, col2 and col3 are passed as arguments to the replication trigger stored procedure.

In other embodiments, an "-update" option specifies that the trigger is a pre-commit update replication only trigger which is fired in response to an update operation to the table of the replicate. A "-delete" option specifies that the trigger is a pre-commit delete replication-only trigger which is fired in response to a delete operation to the table of the replicate.

An exemplary command to create a post-commit replication-only trigger is as follows:
cdr define trigger-connect=serv1-replicate=replname-name=postcommit_sp-postfail col1 col2 col3
The post-commit replication-only trigger defined by the command above results in a replication trigger stored procedure named postcommit_sp to be executed after the data for replicate called replname has failed to be replicated after receiving the replicated commit for the transaction. The format for executing the stored procedure of the post-commit trigger is "execute procedure postcommit_sp(source_server, source_commit_time, operation, col1, col2, col3)." The operation is associated with the operation associated with the post-commit trigger, such as an insert, update or delete.

In the define trigger command, the "-postfail" option specifies that the trigger is a post-commit failure trigger. A "-postsuccess" option specifies that the trigger is a post-commit success trigger.

FIG. 4 depicts a diagram of an embodiment of a replication trigger header table 150 and a replication trigger column table 152 of the global catalog. The registration of a replication-only trigger causes information about the replication-only trigger to be stored in the replication trigger header table 150 and, in some embodiments, the replication trigger column table 152.

Each replicate is associated with a distinct replicate identifier. The replication trigger header table 150 comprises the replicate identifier (ReplicateId) 154 which specifies the replicate that the replication trigger is to be applied, the name of the replication trigger stored procedure (StoredProcedure-Name) to be executed 156, one or more flags 158 which identify the type of replication trigger, and a trigger identifier (TriggerId) 160. The trigger identifier 160 is unique for each replication-only trigger. In various embodiments, the flags comprise a post-commit success trigger flag, a post-commit failure trigger flag, an insert flag, an update flag and a delete flag. The post-commit trigger flag indicates that the replication-only trigger is a post-commit success trigger. The post-commit failure trigger flag indicates that the replication-only trigger is a post-commit failure trigger. The insert flag indicates that the replication-only trigger is a pre-commit replication-only trigger which is associated with an insert operation. The update flag indicates that the replication-only trigger is a pre-commit replication-only trigger which is associated with an update operation. The delete flag indicates that the replication-only trigger is a pre-commit replication-only trigger which is associated with a delete operation.

The replication trigger column table 152 is associated with the replication trigger header table 150. The replication trigger column table 152 comprises the trigger identifier (TriggerId) 164, the column name which (ColumnName) 166 which is to be passed to the stored procedure, and an order sequence order number (OrderSequence) 168. The order sequence number 168 identifies the order of the column, specified by the column name, in a parameter list that is passed to the associated replication trigger stored procedure.

The replication trigger header table 150 and the replication trigger column table 152 are updated in response to the define trigger command. The flags are set in accordance with the options specified by in the define trigger command. For example, in response to the exemplary command to create the pre-commit insert trigger described above, the replication application command line interface inserts a row into the replication trigger header table on the database server specified by the connect option in the define replicate command. The row contains a replicate identifier based on the specified replicate name, a distinct trigger identifier which is determined by the replication application command line interface, an insert flag which is set, and the name of the specified stored procedure in the define trigger command. In addition, the replication application command line interface will insert a row into the replication trigger column table on the database server specified by the connect option for each specified column in the define trigger command. For example, a row is inserted into the replication trigger column table containing the trigger identifier, an order sequence number of one and a column name of col1. The order sequence number is based on the position of the column in a parameter list which is passed to the replication trigger stored procedure. The columns are specified in the define trigger command, for example, col1, col2 and col3, and the order sequence number is based on the order of the column names in the define trigger command. For example, the order sequence number for coil is one; the order sequence number for col2 is two; and the order sequence number for col3 is three.

If the "-update" option is specified in the define trigger command, the update flag is set. If the "-delete" option is specified in the define trigger command, the delete flag is set.

When the "-postfailure" option is specified in the define trigger command, the replication application sets the post-commit failure flag. When the "-postsuccess" option is specified in the define trigger command, the replication application command line interface sets the post-commit success flag.

FIG. 5 depicts a diagram of an embodiment of a replicate description structure 170 which is associated with a trigger linked list 174 having multiple triggers of which one trigger 176-1 is associated with a column linked list 178 having multiple columns. Each replicate is associated with a replicate description structure 170 which describes the data that is being applied. The replicate description structure 170 is typically cached in the memory space used by the replicate definition. The replicate description structure 170 is used by the apply component.

The replicate description structure contains various flags which indicate whether any replication-only triggers have been defined for the replicate. In various embodiments, the replicate description structure contains a post-commit failure flag, a post-commit success flag, an insert flag, an update flag and a delete flag. The post-commit failure flag is set in the replicate description structure if one or more post-commit failure triggers have been defined for the replicate. The post-commit success flag is set in the replicate description structure if one or more-post commit success triggers have been defined for the replicate. The insert flag, the update flag and the delete flag of the replicate description structure are set if one or more pre-commit insert triggers, one or more pre-commit update triggers and one or more pre-commit delete triggers, respectively, have been defined for the replicate.

The replicate description structure 170 also contains a pointer to the trigger linked list 174 of replication trigger header structures (Trigger Header) 176-1 to 176-4. Each replication trigger header structure 176 in the trigger linked list 174 comprises the information from the replication trigger header table 150 (FIG. 4). The replication trigger header structure contains a pointer to a column linked list 178 of one or more replication trigger column structures 180-1 to 180-4, if any. A replication trigger column structure 180 comprises the information from the replication trigger column table 152 (FIG. 4). In various embodiments, updates to the replicate description structure 170 are protected by using an array of read/write mutexes which are hashed by the replicate identifier.

To process pre-commit triggers, prior to applying a replicated insert, update or delete operation, the apply component of the replication application checks the replicate description structure 170 (FIG. 5) to determine if any pre-commit triggers have been registered for the replicate based on the insert, update and delete flags. If a pre-commit trigger has been registered, the trigger linked list 174 (FIG. 5) is traversed to find any replication-only triggers corresponding to the operation. In various embodiments, when a replication-only trigger corresponding to the operation is found, an execute procedure statement is formatted using the information in the replicated row and the associated replication-only trigger stored procedure is executed. For a replication-only trigger which is associated with an update operation if any column names were specified in the define trigger command, one or more columns from the local row are passed to the replication trigger stored procedure as respective arguments based on the replication trigger column structures of the column linked list associated with the replication trigger header structure of the trigger.

The processing of a post-commit trigger is different from the processing of a pre-commit trigger. To process a post-commit trigger, prior to processing a commit in the replicated transaction data, the replication application checks the replicate description structure 170 (FIG. 5) to determine if any post-commit triggers have been registered based on the post-commit success and failure flags. If any post-commit triggers have been registered, the trigger linked list 174 (FIG. 5) is traversed to find the post-commit triggers. For a post-commit trigger, a post-commit trigger request,is posted to the log on the target server. The post-commit trigger request is to request the execution of the stored procedure associated with the post-commit trigger. Subsequently the stored procedure is executed after the transaction associated with the post-commit trigger request has committed or failed to commit.

Figure 6:
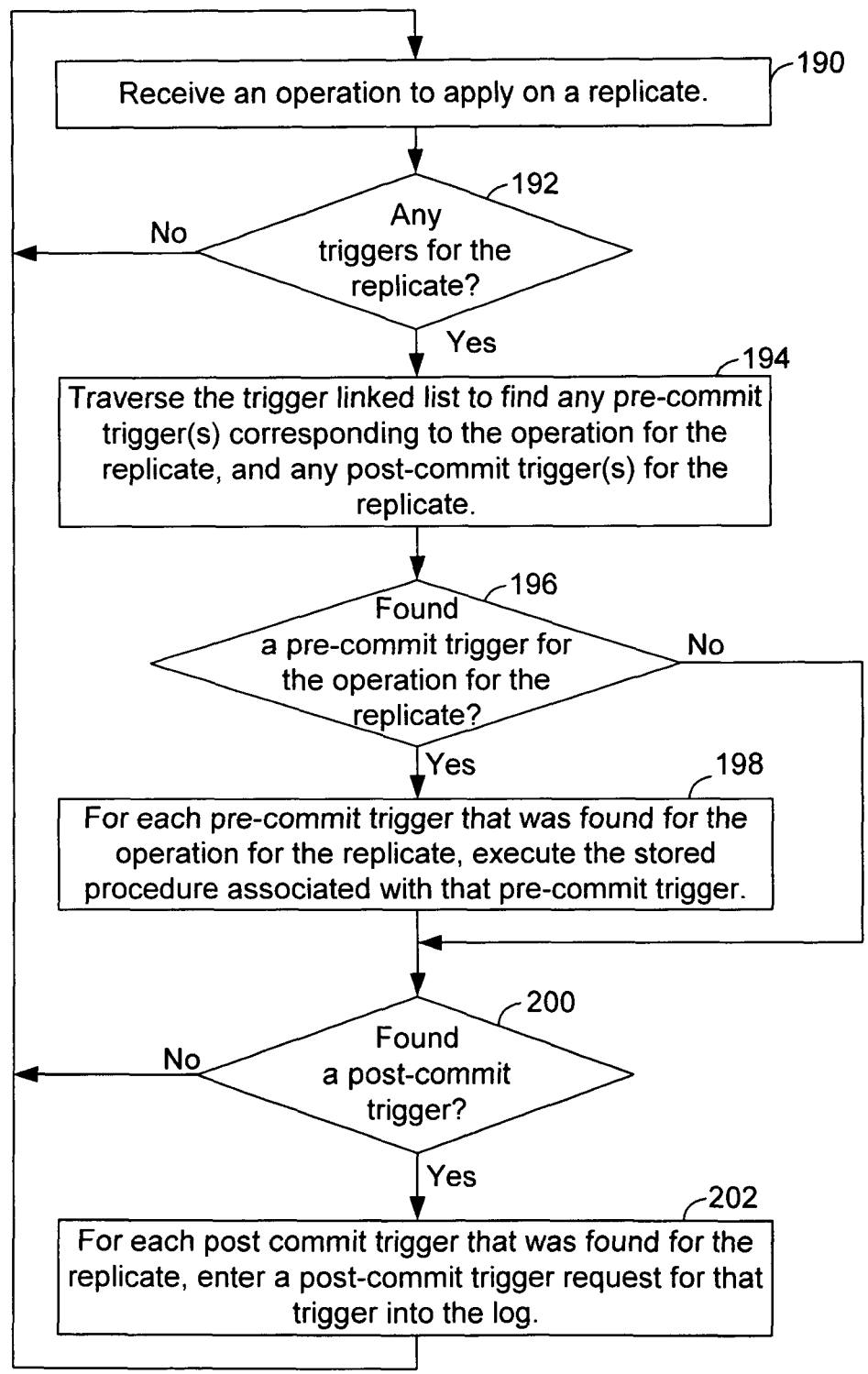
FIG. 6 depicts a flowchart of an embodiment of the processing of a pre-commit trigger and a portion of the processing of a post-commit trigger.

FIG. 6 depicts a flowchart of an embodiment of the processing of a pre-commit trigger and a portion of the processing of a post-commit trigger. In various embodiments, the flowchart of FIG. 6 is implemented in the replication application, typically the apply component.

In step 190, an operation or transactional event to apply on a replicate is received. In various embodiments, the operation to replicate is received from the receive queue. The operation may be an insert operation, update operation, delete operation or a commit.

Step 192 determines whether there any triggers for the replicate. Typically, the apply component examines the pre-commit success, post-commit failure, insert, update and delete flags in the replicate description structure, and if any of those flags are set, the apply component determines that the replicate has a trigger. If step 192 determines that there are no triggers for the replication, step 192 proceeds to step 190.

In response to step 192 determining that there is a trigger, in step 194, the trigger linked list is traversed to find any pre-commit trigger(s) corresponding to the operation for the replicate, and any post-commit trigger(s) for the replicate. In various embodiments, the replicate description structure 170 (FIG. 5) is searched for the triggers. If the insert flag is set in the replication trigger header structure and the operation is an insert, the replication-only trigger is a pre-commit insert replication-only trigger. If the delete flag is set in the replication trigger header structure and the operation is a delete, the replication-only trigger is a pre-commit delete replication-only trigger. If the update flag is set in the replication trigger header structure and the operation is an update, the replication-only trigger is a pre-commit update replication-only trigger. The apply component also examines the post-commit success and failure flags in the replication trigger header structure. If any of the post-commit success and failure flags are set, a post-commit trigger has been defined.

Step 196 determines whether a pre-commit trigger for the operation has been found. In response to step 196 determining that a pre-commit trigger for the operation was found, in step 198, for each pre-commit trigger that was found for the operation for the replicate, the stored procedure associated with that pre-commit trigger is executed. If step 192 determines that there are no triggers for the replicate, step 192 proceeds back to step 190. If step 196 determines that no pre-commit trigger for the operation for the replicate was found, step 196 proceeds to step 200.

Step 200 determines whether any post-commit triggers were found for the replicate. If step 200 does not find a post-commit trigger, step 200 proceeds to step 190.

If step 200 determines that at least one post-commit trigger was found, in step 202, for each post-commit trigger that was found, a post-commit trigger request for that trigger is entered into the log. The post-commit trigger request typically comprises the replicate identifier, the trigger identifier, an indicator of whether the post-commit trigger request is for a success or failure post-commit trigger, the parameters of the replication trigger stored procedure, the name of the replication trigger stored procedure and the replication trigger stored procedure itself. In some embodiments, the post-commit trigger request also contains information describing the operation, such as an insert, update or delete, for which the post-commit trigger was invoked. The post-commit trigger request is also associated with the transaction that is associated with the operation which was received. Step 202 proceeds to step 190.

In some embodiments, an operation is associated with one or more pre-commit triggers. For example, multiple pre-commit insert triggers can be defined on a replicate. In various embodiments, an operation is associated with one or more post-commit triggers. For example, a post-commit success trigger and a post-commit failure trigger can be defined on the replicate, multiple post-commit failure triggers can be defined on the replicate, or multiple post-commit success triggers can be defined on the replicate.

Figure 7:
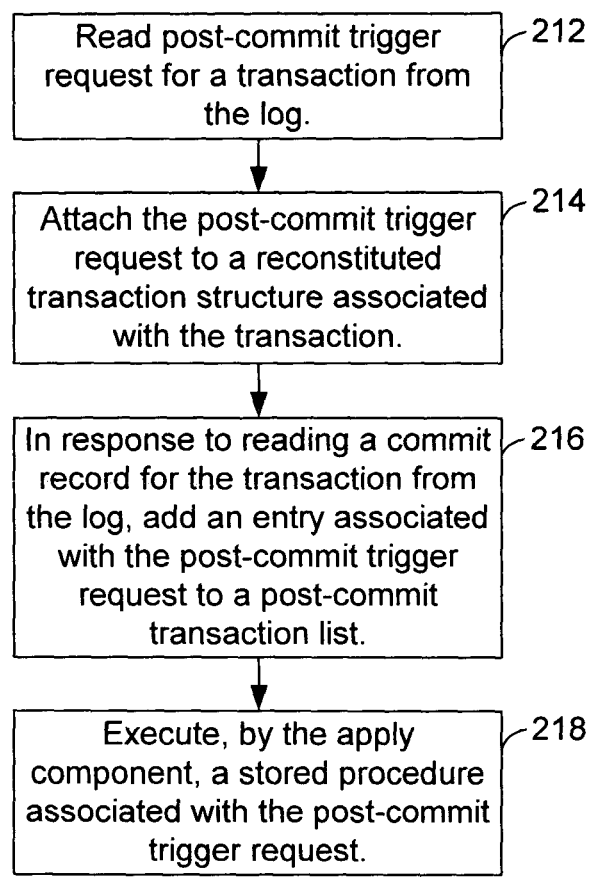
FIG. 7 depicts a high-level flowchart of an embodiment of the processing of a post-commit trigger request by the replication application.

FIG. 7 depicts a high-level flowchart of an embodiment of the processing performed by the apply component for a post-commit trigger request which was posted to the log. In step 212, the post-commit trigger request for a transaction is read from the log. In various embodiments, the snooper reads the post-commit trigger request from the log. In step 214, the post-commit trigger request is attached to a reconstituted transaction structure associated with the transaction. In various embodiments, the grouper attaches the post-commit trigger request to the reconstituted transaction structure. In step 216, in response to reading a commit for the transaction associated with the post-commit trigger request from the log, an entry associated with the post-commit trigger is added to a post-commit transaction list. In step 218, the apply component executes a stored procedure which is associated with the post-commit trigger request.

Figure 8:
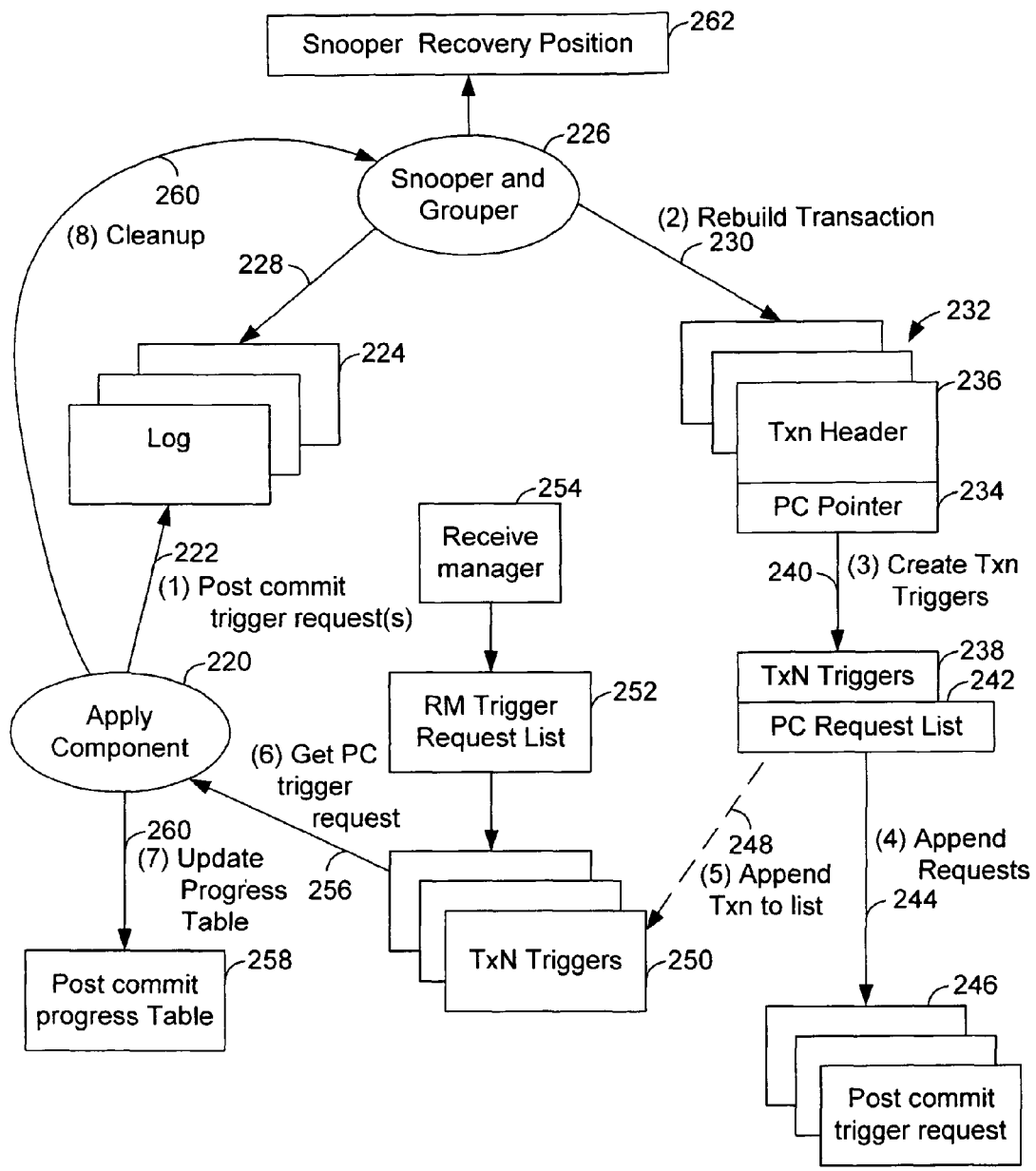
FIG. 8 depicts a block diagram illustrating an embodiment of the processing performed in connection with a post-commit trigger.

FIG. 8 depicts a diagram illustrating an embodiment of the processing performed in connection with a post-commit trigger. The apply component 220 determines that a post-commit trigger has been set for a transaction. As indicated by arrow 222, the post-commit trigger request is posted to the log 224.

As the snooper of the snooper and grouper 226 reads the log as indicated by arrow 228, the snooper and grouper 226 captures the post-commit trigger request and rebuilds the transaction, as indicated by arrow 230 in a reconstituted transaction structure 232 which is used for replication. The snooper and grouper 226 attaches the post-commit trigger request, via post-commit (PC) pointer 234, to the transaction header 236 of the reconstituted transaction structure 232.

The reconstituted post-commit trigger requests are posted to the transaction header 236 by creating a transaction trigger structure (TxN Triggers) 238 when the first post-commit trigger request for a transaction is detected by the snooper, as indicated by arrow 240. The individual post-commit trigger request 246 is then attached to the transaction trigger structure 232 by appending it to a first-in-first-out (FIFO) list (PC Request List) 242, as indicated by arrow 244. As shown by arrow 248, in response to the snooper and grouper 226 reading the commit record for a transaction that has a post-commit trigger request, the transaction trigger structure 238 for that transaction is attached to the tail of a FIFO list 250, that is, the receive manager (RM) Trigger Request List 252 which is contained within a receive manager (RM) control block 254 of the replication application. The RM Trigger Request List 252 is maintained in commit order as the transactions are snooped.

Typically the apply component 220 is processing replicated transaction data from other participants within the replication environment. If there is no work that the apply component 220 is currently able to do, the apply component 220 examines the RM Trigger Request List 252. If a transaction is found in the RM Trigger Request List 252, the apply component 220 retrieves the post-commit trigger request for the transaction as indicated by arrow 256 and processes the stored procedure associated with the post-commit trigger request, passing any parameters contained within the post-commit trigger request.

The apply component 220 maintains a post-commit progress table 258. Using the post-commit progress table ensures that the post-commit triggers are executed only once. As indicated by arrow 260, the apply thread 220 updates the post-commit progress table 258. In various embodiments, the post-commit progress table 258 has a single row which contains the log position of the requesting transaction's commit point that was last asynchronously processed. In some embodiments, the post-commit progress table 258 is the commit progress table described in U.S. application Ser. No. 11/061,071 entitled "Simulating Multi-User Activity While Maintaining Original Linear Request Order for Asynchronous Transactional Events," filed concurrently herewith, by Clarence Madison Pruet III, International Business Machines Corporation (IBM).

In various embodiments the apply component has multiple apply threads. Although multiple apply threads typically process data in parallel, the apply threads commit in transactional order. One reason for the apply threads committing in transactional order is so that the post-commit progress table 258 can be correctly maintained. Various embodiments of maintaining the original linear request order for asynchronous transactional events in a database management system are described in U.S. application Ser. No. 11/061,071 entitled "Simulating Multi-User Activity While Maintaining Original Linear Request Order for Asynchronous Transactional Events," filed concurrently herewith, by Clarence Madison Pruet III, International Business Machines Corporation (IBM).

In various embodiments, prior to processing a transaction associated with a post-commit trigger request, the apply component examines a cached copy of the post-commit progress table 258 to determine if the transaction has already been processed. The apply component compares the log position in the post-commit progress table to the log position of the transaction associated with the post-commit trigger request. If the log position in the post-commit progress table is less than the log position of the transaction associated with the post-commit trigger request, the stored procedure associated with the post-commit trigger request may be invoked. For a post-commit success trigger, the apply component determines whether the operation, that is, the transactional event, associated with the post commit trigger request was successfully committed. If so, the apply component invokes the stored procedure associated with the post-commit trigger request, passing any parameters contained within the post-commit trigger request; otherwise the apply component does not invoke the stored procedure. For a post-commit failure trigger, the apply component determines whether the operation, that is, the transactional event, associated with the post commit trigger request failed to be committed. If so, the apply component invokes the stored procedure associated with the post-commit trigger request, passing any parameters contained within the post-commit trigger request; otherwise the apply component does not invoke the stored procedure. If the log position in the post-commit progress table is not less than the log position of the transaction associated with the post-commit trigger request, the stored procedure associated with the post-commit trigger request has already been executed for the transaction and is not invoked.

When the apply 220 finishes processing a snooped transaction containing a post-commit request, the apply 200 notifies the snooper and grouper 226 which then performs a clean-up, as indicated by arrow 260, if any, and may advance the snooper recovery position 262. For example, during the clean-up, the data structures associated with the post-commit trigger request for the transaction which was processed are removed to free memory space.

Figure 9:
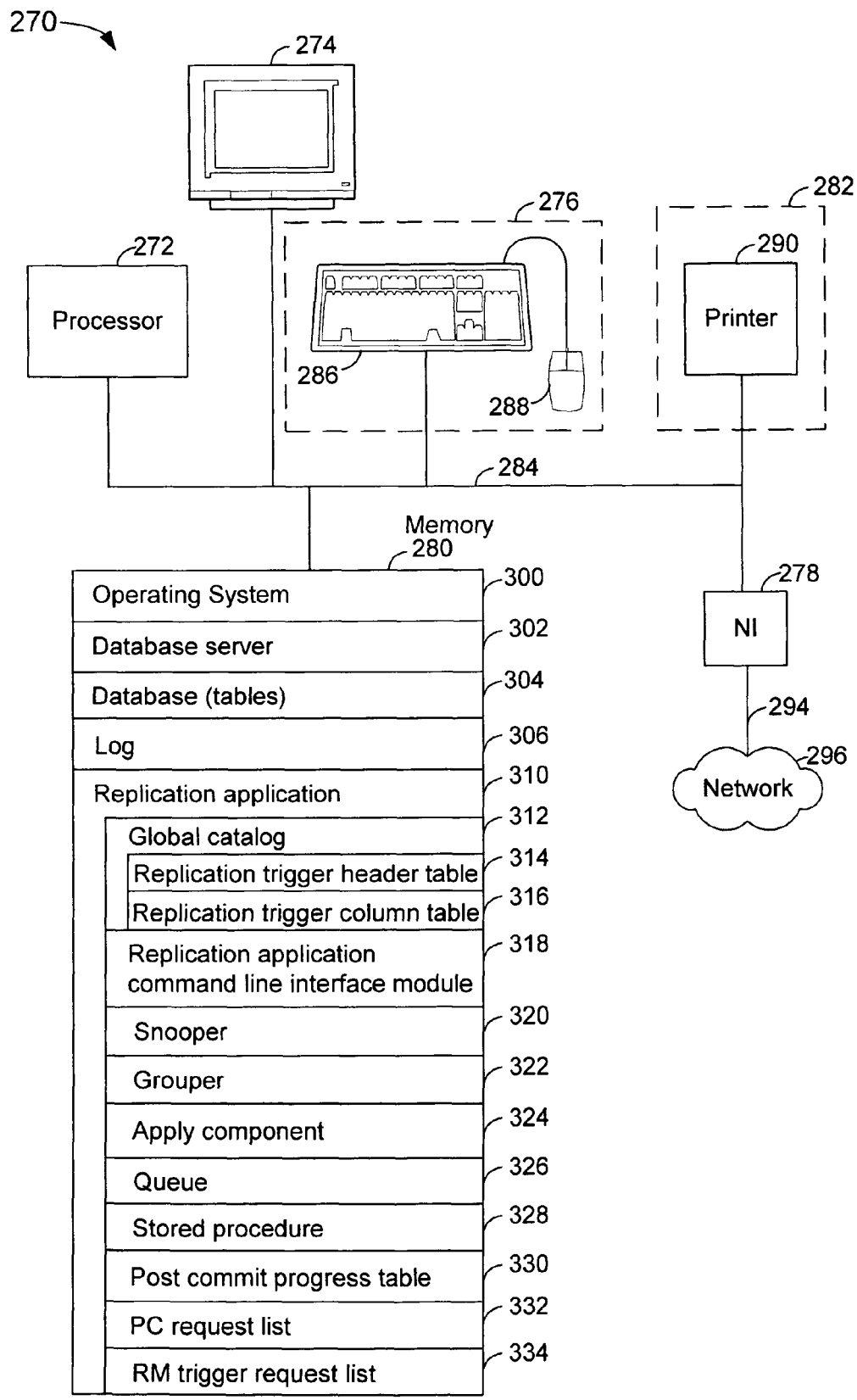
FIG. 9 depicts an embodiment of an illustrative computer system which uses various embodiments of the present invention.

FIG. 9 depicts an embodiment of an illustrative computer system 270 which uses various embodiments of the present invention. The computer system 270 comprises a processor 272, display 274, input interfaces (I/F) 276, communications interface 278, memory 280 and output interface(s) 282, all conventionally coupled by one or more buses 284. The input interfaces 276 comprise a keyboard 286 and a mouse 288. The output interface 282 comprises a printer 290. The communications interface 278 is a network interface (NI) that allows the computer 270 to communicate via the network 254. The communications interface 278 may be coupled to the network 296 via a transmission medium 294 such as a network transmission line, for example twisted pair, coaxial cable or fiber optic cable. In another embodiment, the communications interface 278 provides a wireless interface, that is, the communications interface 278 uses a wireless transmission medium.

The memory 280 generally comprises different modalities, illustratively semiconductor memory, such as random access memory (RAM), and disk drives. In various embodiments, the memory 280 stores an operating system 300, the database server 302, database tables 304, the log 306, and the replication application 310. In various embodiments, the replication application 310 comprises the global catalog 312, the replication trigger header table 314, the replication trigger column table 316, the replication application command line interface module 318, the snooper 320, the grouper 322, the apply component 324, the queue 326, a stored procedure 328, the post-commit progress table 330, and various data structures, including and not limited to the PC request list 332 and the RM Trigger request list 334.

In various embodiments, the specific software instructions, data structures and data that implement various embodiments of the present invention are typically incorporated in the replication application 310. Generally, an embodiment of the present invention is tangibly embodied in a computer-readable medium, for example, the memory 280, and is comprised of instructions which, when executed by the processor 272, cause the computer system 270 to utilize the present invention. The memory 280 may store the software instructions, data structures and data for any of the operating system 300, a database server 302, database tables 304, a log 306, and a replication application 310 in semiconductor memory, in disk memory, or a combination thereof. Other computer memory devices presently known or that become known in the future, or combination thereof, may be used for memory 280.

The operating system 300 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the database server 302 is the IBM Informix Dynamic Server. However, the invention is not meant to be limited to the IBM Informix Dynamic Server and may be used with other database management systems.

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 9 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A method of managing replicated data at a target database, comprising:
    registering a replication-only trigger specifying a replication condition and a stored procedure, the replication-only trigger configured to invoke the stored procedure only upon detecting a replication event at the target database that satisfies the replication condition, wherein the replication-only trigger comprises one of: (i) a pre-commit trigger, and (ii) a post-commit trigger, wherein the pre-commit trigger executes within a transaction that applies the replication event to data in the target database, wherein the post-commit trigger creates an indication specifying whether the replication event is successfully applied to the data in the target database, wherein the replication-only trigger comprises a replication trigger header associated with a replication trigger column;
    monitoring, at the target database, replication events received from a source database to detect when the replication condition is satisfied;
    responsive to detecting a first replication event that satisfies the replication condition specified in the replication-only trigger, invoking the stored procedure specified by the replication-only trigger at the target database; and
    updating a progress table that indicates a commit point of a transaction which was last processed, wherein invoking the specified stored procedure is based on the commit point of the progress table.

2. The method of claim 1, wherein the replication-only trigger is a post-commit trigger, wherein the post-commit trigger is configured to be invoked only once, wherein the replication condition specifies a commit operation, and wherein the stored procedure is invoked after the commit operation has completed.

3. The method of claim 2, further comprising:
    upon detecting that the replication-only trigger is a post-commit trigger, entering a post-commit trigger request into a log; and
    wherein invoking the specified stored procedure is further in response to processing the post-commit trigger request in the log.

4. The method of claim 1, wherein the replication trigger header specifies: (i) a replicate identifier the replication-only trigger header is applied to, (ii) a name of the stored procedure, and (iii) a set of flags identifying a type of the replication-only trigger, wherein the replication trigger column specifies: (i) the trigger identifier, (ii) a name of a database column passed to the stored procedure, and (iii) a sequence order number which identifies an order of the database column passed to the stored procedure.

5. The method of claim 1, wherein the replication-only trigger is a post-commit-success trigger, wherein the replication condition specifies a successful replication of at least a portion of the replication event.

6. The method of claim 1, wherein the replication-only trigger is a post-commit-failure trigger, wherein the replication condition specifies a failure to replicate at least a portion of the replication event.

7. The method of claim 1, wherein the stored procedure specified in the replication-only trigger is configured to be invoked only once, wherein registering the replication-only trigger comprises specifying a set of attributes of the replication-only trigger, wherein the set of attributes comprise: (i) a name of a server hosting the target database, (ii) a replicate name, (iii) a name of the stored procedure, (iv) a type of the replication-only trigger, and (v) a set of database columns passed to the stored procedure.

8. The method of claim 1, further comprising:
    providing a plurality of other replication-only triggers, each specifying a respective replication condition and a respective stored procedure, wherein each of the replication conditions specify a respective commit operation for at least a portion of an associated transaction, and wherein the stored procedures are invoked in an order corresponding to a commit order of the associated transactions.

9. The method of claim 1, wherein the replication condition specifies a transactional event which occurs prior to an associated commit operation, and wherein the stored procedure is invoked prior to the associated commit operation.

10. The method of claim 1, wherein the replication-only trigger is a pre-commit trigger, wherein the replication condition specifies at least one of an insert operation, an update operation and a delete operation, wherein the transaction is at least one of an insert transaction, an update transaction, and a delete transaction.

11. A computer program product for managing replicated data at a target database, comprising:
a non-transitory computer-readable storage medium having computer readable program code embodied therewith, the computer readable program code executable to perform an operation comprising:
registering a replication-only trigger specifying a replication condition and a stored procedure, the replication-only trigger configured to invoke the stored procedure only upon detecting a replication event at the target database that satisfies the replication condition, wherein the replication-only trigger comprises one of: (i) a pre-commit trigger, and (ii) a post-commit trigger, wherein the pre-commit trigger executes within a transaction that applies the replication event to data in the target database, wherein the post-commit trigger creates an indication specifying whether the replication event is successfully applied to the data in the target database wherein the stored procedure specified in the replication-only trigger is configured to be invoked only once, wherein registering the replication-only trigger comprises specifying a set of attributes of the replication-only trigger, wherein the set of attributes comprise: (i) a name of a server hosting the target database, (ii) a replicate name, (iii) a name of the stored procedure, (iv) a type of the replication-only trigger, and (v) a set of database columns passed to the stored procedure;
monitoring, at the target database, replication events received from a source database to detect when the replication condition is satisfied; and
responsive to detecting a first replication event that satisfies the replication condition specified in the replication-only trigger, invoking the stored procedure specified by the replication-only trigger at the target database.

12. The computer program product of claim 11, wherein the replication-only trigger is a post-commit trigger, wherein the post-commit trigger is configured to be invoked only once, wherein the replication condition specifies a commit operation, and wherein the stored procedure is invoked after the commit operation has completed.

13. The computer program product of claim 12, the operation further comprising:
upon detecting that the replication-only trigger is a post-commit trigger, enter a post-commit trigger request into a log; and
wherein the specified stored procedure is invoked further in response to processing the post-commit trigger request in the log.

14. The computer program product of claim 11, wherein the replication-only trigger further comprises a replication trigger header, wherein the replication trigger header specifies: (i) a replicate identifier the replication-only trigger header is applied to, (ii) a name of the stored procedure, and (iii) a set of flags identifying a type of the replication-only trigger, wherein a replication trigger column is associated with the replication trigger header, wherein the replication trigger column specifies: (i) the trigger identifier, (ii) a name of a database column passed to the stored procedure, and (iii) a sequence order number which identifies an order of the database column passed to the stored procedure, the operation further comprising:
updating a progress table that indicates a commit point of a transaction which was last processed, wherein the computer readable program code to invoke the specified stored procedure is based on the commit point of the progress table.

15. The computer program product of claim 11, wherein the replication-only trigger is a post-commit-success trigger, wherein the replication condition specifies a successful replication of at least a portion of the replication event.

16. The computer program product of claim 11, wherein the replication-only trigger is a post-commit-failure trigger, wherein the replication condition specifies a failure to replicate at least a portion of the replication event.

17. The computer program product of claim 11, the operation further comprising:
providing a plurality of other replication-only triggers, each specifying a respective replication condition and a respective stored procedure, wherein each of the replication conditions specify a respective commit operation for at least a portion of an associated transaction, and wherein the stored procedures are invoked in an order corresponding to a commit order of the associated transactions.

18. The computer program product of claim 11, wherein the replication condition specifies a transactional event which occurs prior to an associated commit operation, and wherein the stored procedure is invoked prior to the associated commit operation.

19. The computer program product of claim 11, wherein the replication-only trigger is a pre-commit trigger, wherein the replication condition specifies at least one of an insert operation, an update operation and a delete operation, wherein the transaction is at least one of an insert transaction, an update transaction, and a delete transaction.

20. A system, comprising:
a processor; and
a memory containing a program that, when executed by the processor, performs an operation for managing replicated data at a target database, the operation comprising:
registering a replication-only trigger specifying a replication condition and a stored procedure, the replication-only trigger configured to invoke the stored procedure only upon detecting a replication event at the target database that satisfies the replication condition, wherein the replication-only trigger comprises one of: (i) a pre-commit trigger, and (ii) a post-commit trigger, wherein the pre-commit trigger executes within a transaction that applies the replication event to data in the target database, wherein the post-commit trigger creates an indication specifying whether the replication event is successfully applied to the data in the target database wherein the stored procedure specified in the replication-only trigger is configured to be invoked only once, wherein registering the replication-only trigger comprises specifying a set of attributes of the replication-only trigger, wherein the set of attributes comprise: (i) a name of a server hosting the target database, (ii) a replicate name, (iii) a name of the stored procedure, (iv) a type of the replication-only trigger, and (v) a set of database columns passed to the stored procedure;

monitoring, at the target database, replication events received from a source database to detect when the condition replication is satisfied; and responsive to detecting a first replication event that satisfies the replication condition specified in the replication-only trigger, invoking the stored procedure specified by the replication-only trigger at the target database.

21. The system of claim 20, wherein the replication-only trigger is a post-commit trigger, wherein the post-commit trigger is configured to be invoked only once, wherein the replication condition specifies a commit operation, and wherein the stored procedure is invoked after the commit operation has completed.

22. The system of claim 21, the operation further comprising:

upon detecting that the replication-only trigger is a post-commit trigger, entering a post-commit trigger request into a log; and wherein invoking the specified stored procedure is further in response to processing the post-commit trigger request in the log.

23. The system of claim 20, wherein the replication-only trigger further comprises a replication trigger header, wherein the replication trigger header specifies: (i) a replicate identifier the replication-only trigger header is applied to, (ii) a name of the stored procedure, and (iii) a set of flags identifying a type of the replication-only trigger, wherein a replication trigger column is associated with the replication trigger header, wherein the replication trigger column specifies: (i) the trigger identifier, (ii) a name of a database column passed to the stored procedure, and (iii) a sequence order number which identifies an order of the database column passed to the stored procedure, the operation further comprising:

updating a progress table that indicates a commit point of a transaction which was last processed, wherein invoking the specified stored procedure is based on the commit point of the progress table.

24. The system of claim 20, wherein the replication-only trigger is a post-commit-success trigger, wherein the replication condition specifies a successful replication of at least a portion of the replication event.

25. The system of claim 20, wherein the replication-only trigger is a post-commit-failure trigger, wherein the replication condition specifies a failure to replicate at least a portion of the replication event.

26. The system of claim 20, the operation further comprising:

providing a plurality of other replication-only triggers, each specifying a respective replication condition and a respective stored procedure, wherein each of the replication conditions specify a respective commit operation for at least a portion of an associated transaction, and wherein the stored procedures are invoked in an order corresponding to a commit order of the associated transactions.

27. The system of claim 20, wherein the replication condition specifies a transactional event which occurs prior to an associated commit operation, and wherein the stored procedure is invoked prior to the associated commit operation.

28. The system of claim 20, wherein the replication-only trigger is a pre-commit trigger, wherein the replication condition specifies at least one of an insert operation, an update operation and a delete operation, wherein the transaction is at least one of an insert transaction, an update transaction, and a delete transaction.

* * * * *